United States Patent [19]

Knudsen

[11] 4,420,303

[45] Dec. 13, 1983

[54] METHOD AND APPARATUS FOR THERMALLY TREATING PULVERULENT MATERIALS

[75] Inventor: Hans B. Knudsen, Kolding, Denmark

[73] Assignee: F. L. Smidth & Co., Cresskill, N.J.

[21] Appl. No.: 321,700

[22] Filed: Nov. 16, 1981

[30] Foreign Application Priority Data

Nov. 17, 1980 [GB] United Kingdom ................ 8036856

[51] Int. Cl.³ ...................... F27B 15/00; F26B 17/00; C04B 7/02
[52] U.S. Cl. .................................... 432/14; 34/57 E; 106/100; 432/105; 432/106
[58] Field of Search .................. 432/14, 16, 105, 106, 432/113; 106/100; 34/57 E

[56] References Cited

U.S. PATENT DOCUMENTS

| | | | |
|---|---|---|---|
| 2,489,211 | 11/1949 | Witt | 432/67 |
| 2,744,338 | 5/1956 | Rothe | 34/57 E |
| 2,776,132 | 1/1957 | Pyzel | 106/100 |
| 2,911,730 | 11/1959 | Schaub et al. | 34/57 E |
| 3,013,786 | 12/1961 | Pyzel | 432/58 |
| 3,603,568 | 9/1971 | Ritzmann | 432/58 |
| 3,799,735 | 3/1974 | Jensen | 432/16 |
| 4,002,420 | 1/1977 | Christiansen | 432/58 |
| 4,004,876 | 1/1977 | Sylvest | 432/106 |
| 4,071,962 | 2/1978 | Saeman | 432/118 |

FOREIGN PATENT DOCUMENTS

| | | |
|---|---|---|
| 2738987 | 3/1974 | Fed. Rep. of Germany . |
| 2279043 | 2/1976 | France . |
| 58-3916 | 4/1983 | Japan . |
| 457957 | 12/1936 | United Kingdom . |
| 959446 | 6/1944 | United Kingdom . |
| 1396402 | 6/1975 | United Kingdom . |
| 1446241 | 8/1976 | United Kingdom . |

Primary Examiner—John J. Camby
Attorney, Agent, or Firm—Pennie & Edmonds

[57] ABSTRACT

A method for thermally treating pulverulent material, i.e., keeping the material at a certain temperature, the treating temperature, in a desired period of time, in particular sintering, pulverulent material in a cylindrical reaction chamber with an axis slightly inclined to the horizontal after the material has been heated to the treating temperature outside the reaction chamber suspended in a gas. The method is especially applicable for thermally treating materials which tend to become sticky at the treating temperature, in particular for sintering pulverulent materials, i.e., agglomerating these by heating without complete melting. However, the method is also useful for general thermal treatment where sintering is not intended, e.g., for burning Bauxite, Mesa and phosphate bearing ores. An example of a sintering process to which the invention is particularly applicable is the manufacturing of cement clinker where the pulverulent material to be sintered is hot calcined cement raw meal. An apparatus for practicing the method of the present invention is also disclosed.

19 Claims, 14 Drawing Figures

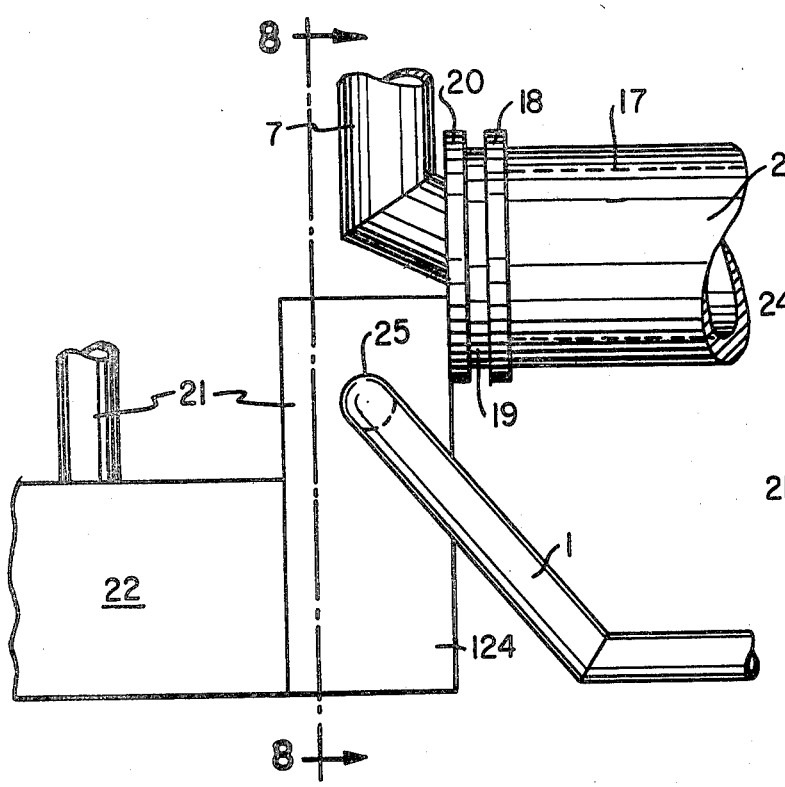
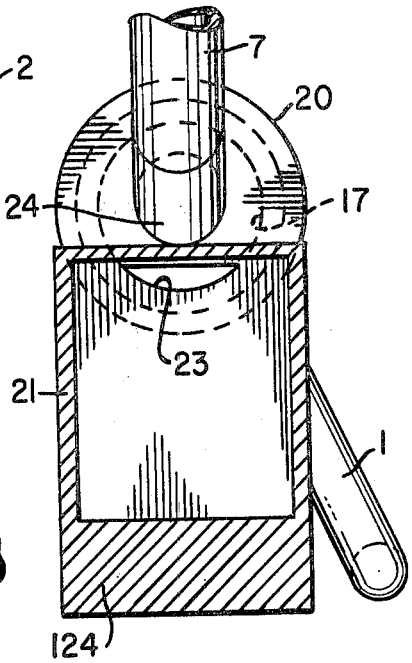
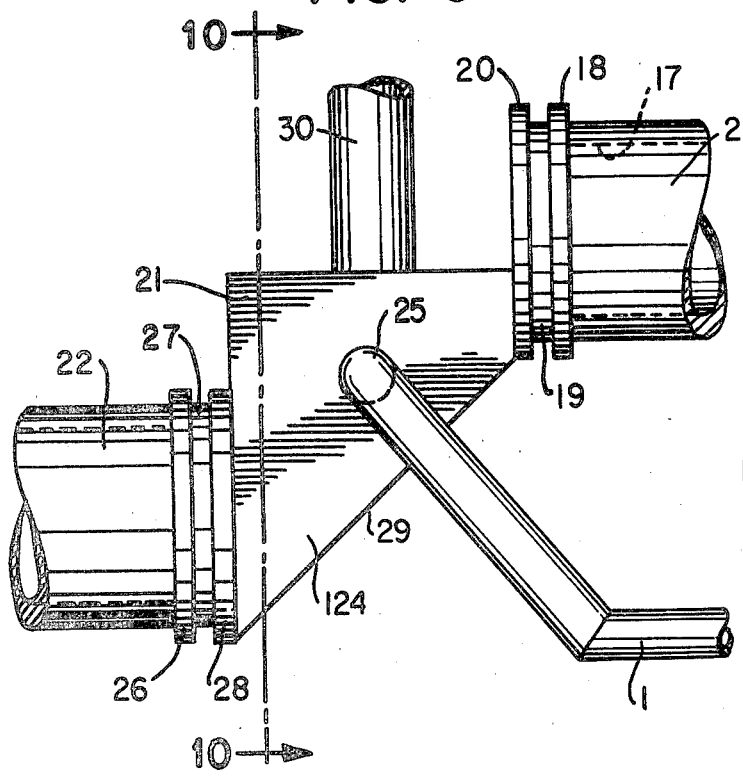
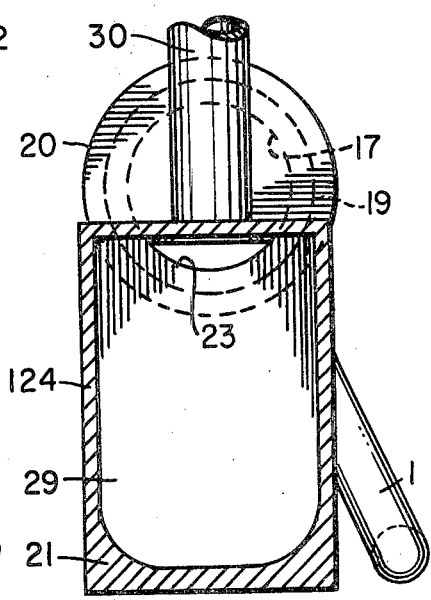

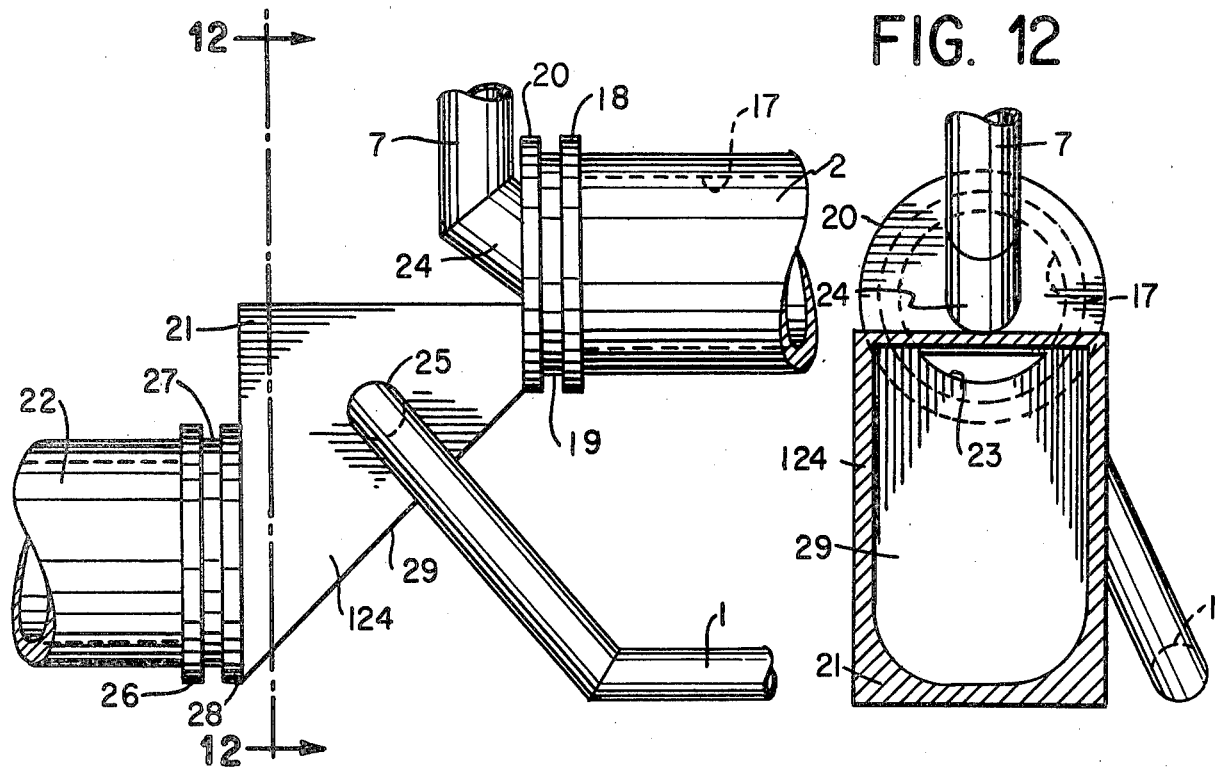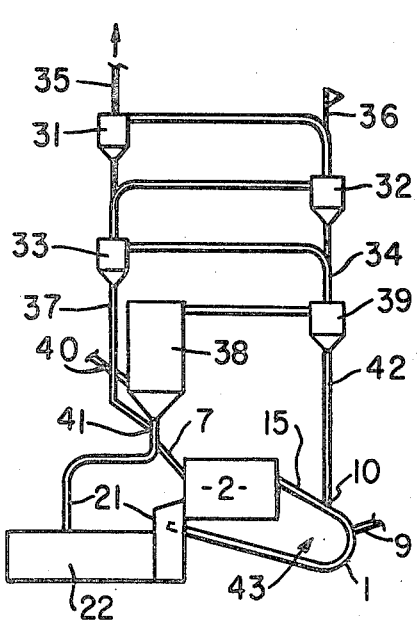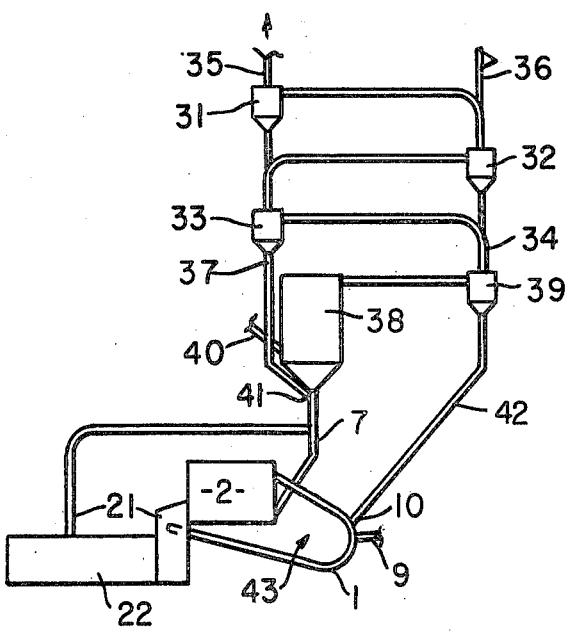

METHOD AND APPARATUS FOR THERMALLY TREATING PULVERULENT MATERIALS

TECHNICAL FIELD

The present invention relates to a method of and an apparatus for thermally treating pulverulent material.

BACKGROUND ART

According to the traditional, and until now the only feasible method within the cement industry of sintering pulverulent materials, the cement raw material is introduced in the form of a layer of material, and sintered on its way through a rotary kiln, possibly co-currently but usually countercurrently to a flow of combustion gas passed through the rotary kiln and generated by combustion of fuel introduced at an air inlet end of the rotary kiln. Usually, the raw materials are subjected to preheating and calcination, i.e., decomposition of $CaCO_3$ to $CaO$ and $CO_2$, in suspension outside the rotary kiln. However, at least the heating from calcination temperature to sintering temperature as well as the sintering proper take place in the rotary kiln.

This type of rotary kiln, however, is not an ideal apparatus. The essential drawback is the relative inefficient heat transfer during the process of heating the material to the treating, e.g., the sintering temperature. Because of this the machinery dimensions are necessarily large, resulting in high initial apparatus costs, a substantial heat loss and a considerable thermal inertia leading to long starting up periods and control problems as well.

Another disadvantage of the rotary kiln is the rather limited number of variable process parameters available; as a result of which it is difficult at the same time to optimize the heating up process and the thermal treating process.

Numerous proposals for eliminating these drawbacks have been made and can be classified in two groups:

The first group comprises methods for obtaining an improved heat economy of the rotary kiln.

The second group comprises attempts to replace the rotary kiln by another more efficient heat treating apparatus.

The first group includes a method for improving the heat exchange between particles of raw material and the hot combustion gases by alternatively lifting and dropping the particles during their passage down the kiln by means of a trough-shaped conveyor flights to produce curtains of falling particles extending across the kiln as described in U.S. Pat. No. 3,799,735 to Jensen. An improved heat economy is thus achieved but it cannot be said that the above drawbacks of the traditional rotary kiln have been eliminated satisfactorily.

To the same group belong two methods in which the rotary kiln is also used as a suspension preheater, as described in Japanese Patent Publication No. 3916 to Mamoto of 1963 and British Patent Specification No. 1,396,402 to KHD.

The Japanese Patent publication relates to a process and kiln apparatus for burning cement wherein the heat transfer to the non-preheated material delivered to the kiln is sought to be maximized. According to this process cement raw materials are introduced either at the forward or at an intermediate position of the kiln suspended in a stream of hot air and allowed to be heated while flowing with the kiln gases towards the rear end of the kiln. Before the kiln gases reach the rear end of the kiln the material is supposed to be precipitated onto the kiln floor inside the kiln and the precipitated material is then subjected to further heat treatment while moving along the inclined kiln bottom towards its lower-lying forward end. For many reasons this method has not been in practical use. In order to obtain proper precipitation of the suspended material excessive kiln dimensions both with respect to kiln length and kiln diameter at the rear end would be necessary.

Another process and kiln apparatus, wherein the material passes through a reaction drum, e.g., a rotary kiln twice, first in suspension and then in a precipitated state has been suggested. According to British Patent Specification No. 1,396,402 the material is passed through a reaction chamber constructed as a rotational drum provided with a burner, i.e., a rotary kiln, as a suspension in a gas, withdrawn from the rotary kiln in suspension, precipitated from the gas in a separator, and reintroduced into the rotary kiln in the form of a layer of material and further heat treated while moving along the inclined kiln bottom.

Instead of arranging a burner in the rotational drum a combustion chamber may be provided upstream of the reaction chamber. In this case the material is suspended in and heated by the hot exit gas from the combustion chamber.

In both cases the precipitation problems inherent in the Japanese method are solved, but these methods are not suited for treating sticky materials such as cement raw meal at a temperature close to the sintering temperature because the material will build up in the precipitator and quickly block it.

The second group comprises proposals for abolishing the rotary kiln entirely.

Thus, U.S. Pat. No. 2,776,132 to Pyzel discloses a method of manufacturing cement clinker according to which cement raw meal and fuel are introduced into a fluid bed where the heat generated by combustion of the fuel evokes partly calcining of raw meal and partly heating of the calcined raw meal to the temperature (approximately 1400° C.–1450° C.) at which the material sinters into cement clinker.

A later issued U.S. Pat. No. 3,013,786 to Pyzel discloses a similar method differing from the previous one in that the raw material is calcined not in a fluid bed, but suspended in a hot gas, whereafter the calcined material is separated from the gas and sintered in a fluid bed under simultaneous addition of fuel.

By both methods an impoved heat economy is obtained because the heat transfer in suspension and in a fluid bed is far more efficient than in a rotary kiln. On the other hand another significant disadvantage is encountered which has prevented these methods from ever having been of practical use. The pulverulent materials are partly molten and extremely sticky at the sintering temperature. Consequently, a fluid bed with such material has a marked tendency to form cakings, leading to frequent interruption in operation.

Previously, e.g., in U.S. Pat. No. 2,489,211 to Witt it has been proposed to sinter cement raw meal in suspension by head on collision of a flow of raw meal suspended in air with a flow of hot gas. This collision takes place in a reaction chamber in which the solid material is separated from the gas and sinks while the gas leaves the reaction chamber at the top.

This method has not been in practical use primarily because the material is not allowed sufficient reaction time for the mineral formation occuring at the sintering temperature, and secondly, because, should any sintering occur, the material would deposit on the walls of the reaction chamber during the separation phase as a consequence of its sticky nature, ultimately blocking the chamber.

British Patent Specification No. 959,446 to Heidelberg proposes another method of manufacturing cement clinker by suspension sintering, according to which fine raw material in a reaction zone is introduced into an ascending hot gas stream having a temperature sufficient to cause calcining and sintering of the raw material, and a flow velocity sufficient to keep the raw material suspended in the gas stream until calcined and sintered. The calcined and sintered material is precipitated from the suspension and withdrawn from the reaction zone by briefly interrupting the introduction of raw material and hot gas.

This method has found no practical use either, partly because its batchwise nature makes it very difficult to achieve a homogenous product, and partly because this method also leads to serious problems with cakings formed where the sticky material collides with the walls in the reaction zone.

U.S. Pat. No. 3,603,586 to Ritzmann discloses a continuous process with heating to sintering temperature and sintering of material in suspended state. The specification further discloses an apparatus for such heat treatment of fine material, e.g., cement raw material, comprising a multicyclone material preheater and a multicyclone cooler, and a burning section comprising a tubular firing chamber in which a suspension of preheated material is burned, the firing chamber being connected to a separating chamber constructed as an ordinary cyclone in which the product is precipitated.

This apparatus has not found practical use either within the cement industry, partly because of a marked tendency to the formation of cakings in the separating cyclone, and partly because realistic gas velocities and apparatus dimensions only allow a very short period of treatment which is insufficient for obtaining the desired mineral formation.

Finally, British Patent Specification No. 457,957 to Saint Jacques discloses a furnace for the treatment of pulverulent material said to be particularly suited for use in the production of cement clinker. The raw material, suspended in an air flow, is introduced tangentially at the top of this furnace which has the form of a vertically oriented cyliner. Further down additional air is introduced along with fuel. During the combustion the raw material is heated to sintering temperature in a suspended state. As the only exit for the gas is an outlet in the top of the furnace, the gas with the suspended raw material particles will follow a spiral path downwardly inside the furnace, after which the gas changes direction and leaves the furnace through the gas outlet, whereas the material particles are separated and sink to a rotating hearth provided with one or more tangential burners arranged at the bottom of the furnace.

This apparatus has not been used within the cement industry. One of the reasons for this is a strong tendency to the formation of cakings on the kiln walls. I have invented a method and apparatus for thermally treating, in particular, sintering, pulverulent raw materials which avoids the disadvantages of the prior art.

DISCLOSURE OF THE INVENTION

A method of thermally treating pulverulent material in a reaction chamber having its axis slightly inclined to the horizontal, comprising heating the material in suspension to a predetermined treating temperature outside the reaction chamber, admitting the suspension with a tangential velocity component in the upper end portion of the reaction chamber so as to separate the material heated to the predetermined treating temperature from the suspension in said upper end portion of the reaction chamber, rotating the reaction chamber, thermally treating the separated material during its passage through the reaction chamber, discharging the thermally treated separated material from a lower end portion of the reaction chamber, and withdrawing the gas from the reaction chamber through at least one of its ends.

Thus, the present invention is directed to a method of thermally treating, in particular sintering, pulverulent material in a cylindrical reaction chamber with an axis slightly inclined to the horizontal after the material has been heated to the treating temperature outside the reaction chamber suspended in a gas thereby providing advantages of heat economy achieved by heating to treating temperature in suspension, and permitting a variable and controllable period of treatment, while simultaneously avoiding the disadvantages mentioned above due to the sticky nature of the treated materials.

Further, it is the object of the invention to provide a compact apparatus for carrying out the method according to the invention.

Surprisingly, it has now been found that the object of the invention can be achieved by a method of thermally treating, in particular sintering, pulverulent material in a cylindrical reaction chamber with axis slightly inclined to the horizontal, after the material has been heated to the treating temperature outside the reaction chamber suspended in a gas, the method being characterized by separating the material heated to the treating temperature from the suspension in the upper part of the reaction chamber by introducing the suspension with a tangential velocity component in the upper end of the reaction chamber; keeping the reaction chamber slowly rotating and thermally treating, in particular agglomerating and sintering, the separated material during its passage through the reaction chamber; discharging the thermally treated material from the lower end of the reaction chamber; and withdrawing the gas from the reaction chamber through one of its ends.

The thermal treatment can thus be performed in a particularly advantageous way. The material is heated to the treating temperature in suspension providing a heating up which is far more rapid and efficient than in the traditional rotary kiln.

The improved heat transfer permits a radical reduction of the apparatus dimensions with consequent advantages, and the use of low grade fuel not usable in traditional sintering due to an insufficiently high flame temperature.

The critical phase during which the material heated to the treating temperature is separated from the suspension takes place mainly in the upper part of the reaction chamber which acts as a horizontal cyclone because the tangential velocity component of the suspension causes a rapid helical movement of the suspension in the reaction chamber.

Since the reaction chamber is kept slowly rotating, a tendency of the material to stick together and form cakings will lead to no problems because the reaction chamber will act not only as a separator but at the same time as a rotating agglomeration drum.

On the contrary a sticky character of the material will be advantageous in causing a preliminary agglomeration of the fine material during the separation, leading to an improved separation efficiency.

Even a tendency to the formation of cakings will be advantageous, because it will lead to a lining-protecting crust formation in the reaction chamber as in the hot zones of a traditional rotary kiln.

The thermal treatment proper, in particular a final agglomeration and sintering, will take place while the separated material is passing through the rotating reaction chamber, i.e., under conditions which can be controlled independently of the heating and separating process, e.g., by varying the speed of rotation of the reaction chamber.

The material discharged from the reaction chamber may be fed directly to a cooler of known type, e.g., a grate cooler or a rotary drum cooker, but it may also be subjected to an aftertreatment in a small rotating drum before it is fed to the cooler.

The advantage of carrying out the thermal treatment in two stages is that the material separation phase and part of the thermal treatment phase are kept apart so that the latter may take place in a durm having a particularly small radius, i.e., having particularly small heat loss.

The trangential velocity component of the suspension may be provided by introducing the suspension close to the cylindrical wall of the reaction chamber in a direction substantially parallel to a tangent to the closest part of the wall and almost perpendicular to the axis of the reaction chamber.

Collisions between suspended particles and between particles and walls outside the reaction chamber may thus be kept to a minimum, i.e., the risk of formation of cakings outside the reaction chamber is minimized.

Alternatively, the tangential velocity component of the suspension may be provided by bringing the suspension into rotation before it is introduced axially into the reaction chamber.

The advantage of axial introduction of a rotating suspension is that it is possible to reduce the area of a stationary upper end wall part of the reaction chamber whereby a peripheral part of the upper end wall may be fixed to the reaction chamber. The problems of procuring an air-tight connection between movable and stationary apparatus parts are thus reduced.

The gas may be withdrawn from the reaction chamber through is upper or lower end.

The advantage of withdrawing the gas through the upper end of the reaction chamber is that all risks of resuspending the precipitated material are eliminated.

However, withdrawing the gas through the lower end of the reaction chamber presents several disadvantages, e.g., compensation of heat loss in the lower part of the reaction chamber, improved gas flow characteristics and lower pressure drop.

Thus, the present method maintains the material at a certain temperature, i.e., the treating temperature, in a desired period of time. In particular the method provides sintering, pulverulent material in a cylindrical reaction chamber with an axis slightly inclined to the horizontal after the material has been heated to the treating temperature outside the reaction chamber suspended in a gas. The method is especially applicable for thermally treating materials which tend to become sticky at the treating temperature, in particular for sintering pulverulent materials, i.e., agglomerating these by heating without complete melting. However, the method is also useful for general thermal treatment where sintering is not intended, e.g., for burning Bauxite, Mesa and phosphate bearing ores. An example of a sintering process to which the invention is particularly applicable is the manufacturing of cement clinker where the pulverulent material to be sintered is hot calcined cement raw meal.

The present invention also includes an apparatus for thermally treating, in particular sintering, pulverulent materials by the method according to the invention, the apparatus being characterized by a cylindrical member rotatable around an axis slightly inclined to the horizontal and provided with end walls and a rotary drive to define a cylindrical reaction chamber; a suspension inlet duct connected to the upper end of the reaction chamber sustantially tangentially to the inner circumferential surface of the reaction chamber; a gas outlet duct connected to one end of the reaction chamber; and an outlet for the thermally treated material at the lower end of the reaction chamber.

Broadly stated, the apparatus of the invention comprises a reaction chamber having its axis slightly inclined to the horizontal, means for heating the material in suspension to a predetermined treating temperature outside the reaction chamber, means for admitting the suspension with a tangential velocity component in the upper end portion of the reaction chamber so as to separate the material heated to the predetermined treating temperature from the suspension in said upper end portion of the reaction chamber, means for slowly rotating the reaction chamber, means for thermally treating the separated material during its passage through the reaction chamber, means for discharging the thermally treated separated material from a lower end portion of the reaction chamber, and means for withdrawing the gas from the reaction chamber through at least one of its ends.

In one construction, the reaction chamber is provided with a constriction member situated at a distance from the suspension inlet duct connection constituting approximately one third of the total length of the reaction chamber.

This constriction member, which is preferably provided as a thickening of the lining in the reaction chamber, and preferably has an inner diameter constituting 40-80% of the inner diameter of the reaction chamber provides a division of the reaction chamber into separating and thermally treating sections ensuring a highly efficient material separation.

According to one preferred embodiment the tangential connection between the suspension inlet duct and the upper end of the reaction chamber is provided by mounting the suspension duct at an inlet opening in the upper end wall close to the cylindrical wall of the reaction chamber and directed substantially parallel to a tangent to the closest part of the cylindrical wall and almost perpendicular to the axis of the reaction chamber.

According to another preferred embodiment the tangential connection between the suspension inlet duct and the upper end of the reaction chamber is provided via a stationary cylindrical member, coaxial with and smaller in diameter than the reaction chamber, defining a spiral flow chamber with a tangential suspension inlet and an axial suspension outlet communicating with the reaction chamber.

The connection between the gas outlet duct and the reaction chamber may be provided by mounting the gas outlet duct at an outlet opening in one or other stationary end wall parts of the reaction chamber.

The outlet for the thermally treated material may be an opening in the lower part of the lower end wall of the reaction chamber, which may communicate with a cooler for the discharged material.

BRIEF DESCRIPTION OF THE DRAWINGS

The present invention is described in detail below with reference to the accompanying drawings wherein:

FIG. 7 is a side elevational view of one embodiment of a material outlet end of a reaction chamber according to the present invention.

FIG. 8 is a front elevational view of the material outlet and taken along the line 8—8 of FIG. 7.

FIG. 9 is a side elevational view of an alternative embodiment of the material outlet end of FIG. 7.

FIG. 10 is a front elevational view of the material outlet end taken along the lines 10—10 of FIG. 9.

FIG. 11 is a side elevational view of a second alternative embodiment of the material outlet end of FIG. 7.

FIG. 12 is a front elevational view of the material outlet end taken along the lines 12—12 of FIG. 11.

FIG. 13 is a schematic illustration of one embodiment of a cement producing plant comprising the apparatus according to the invention as a sintering reactor, replacing the traditional rotary kiln.

FIG. 14 is a schematic illustration of an alternative embodiment of a cement producing plant comprising the apparatus according to the invention as a sintering reactor, replacing the traditional rotary kiln.

DESCRIPTION OF THE BEST MODE OF THE INVENTION

Figure 1:
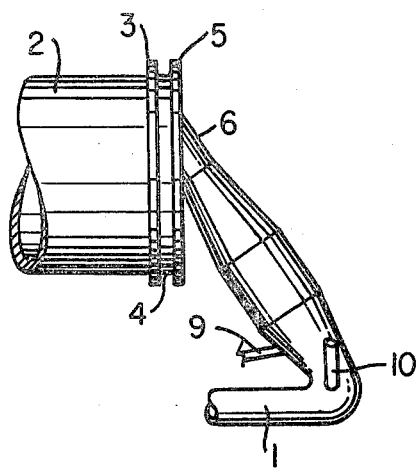
FIG. 1 is a side elevational view of one embodiment of a tnagential suspension inlet to a reaction chamber according to the present invention.

In the drawings, the same reference numbers are used herein for identical or like apparatus parts for sake of convenience of illustration.

Figure 2:
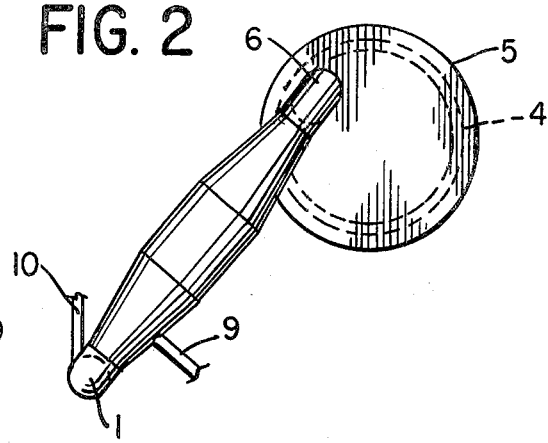
FIG. 2 is a front elevational view of the tangential inlet of FIG. 1.
Figure 3:
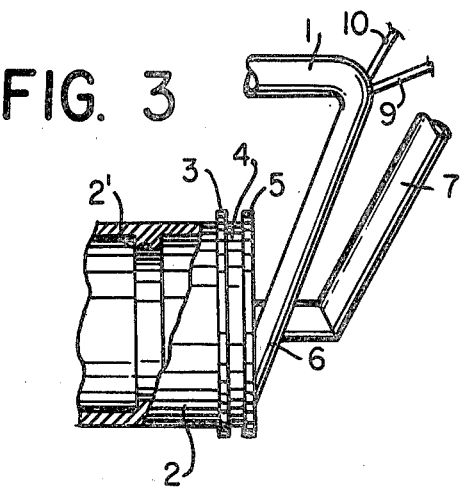
FIG. 3 is a side elevational view of an alternative embodiment of the tangential inlet of FIG. 1.
Figure 4:
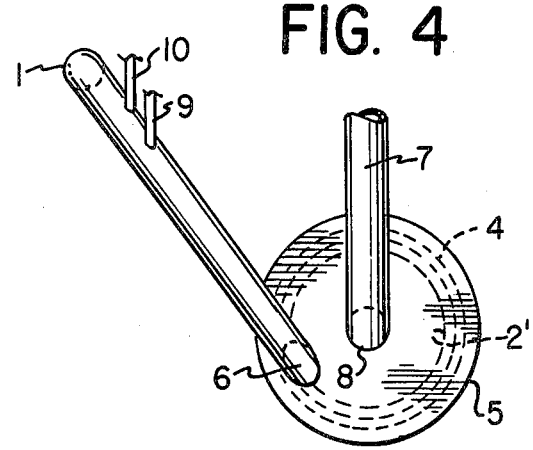
FIG. 4 is a front elevational view of the tangential inlet of FIG. 3.

FIGS. 1 and 3 are schematic side views and FIGS. 2 and 4 are corresponding schematic front views showing direct tangential inlets of a suspension inlet duct 1 into a rotatable reaction chamber 2 having an end flange 3 sealed with a seal ring 4 to a stationary end wall 5 equipped with an opening 6 connected with the suspension inlet duct 1. In the example shown in FIGS. 1 and 2 a combustion gas outlet duct is situated at the opposite end of the reaction chamber 2. In the example shown in FIGS. 3 and 4 a gas outlet duct 7 is situated at the upper end of the reaction chamber 2 communicating with the reaction chamber via an opening 8 in the end wall 5. The suspension inlet duct 1 is provided with inlets 9 and 10 for fuel and material, respectively. FIGS. 3 and 4 further show a constriction member 2' provided as a thickening of the lining in the reaction chamber 2.

Figure 5:
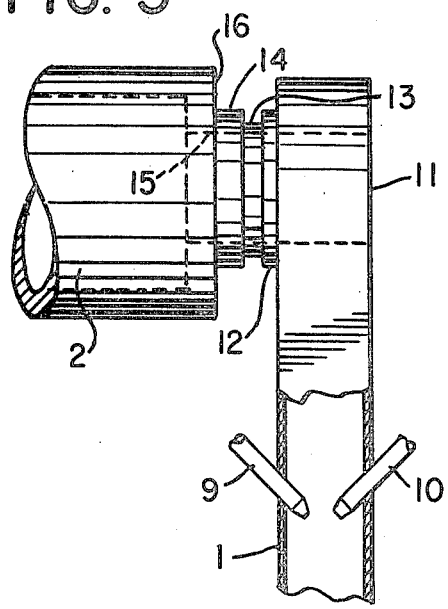
FIG. 5 is a side elevational view of a second alternative embodiment of a tangential suspension inlet to a reaction chamber according to the present invention.
Figure 6:
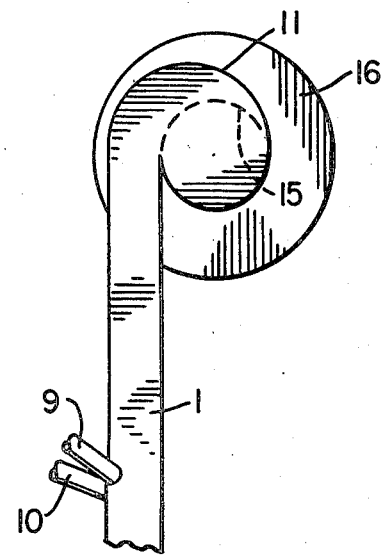
FIG. 6 is a front elevational view of the tangential inlet of FIG. 5.

FIGS. 5 and 6 shown as a schematic side view and a schematic front view, respectively, a suspension inlet with a spiral flow chamber 11 having a flange 12 sealed with a seal ring 13 to a flange 14 on the upper end of the reaction chamber 2, defining an axial suspension inlet opening 15. A peripheral part 16 of the end wall of the reaction chamber 2 is fixed to the reaction chamber. The suspension inlet duct 1 is provided with inlets 9 and 10 for fuel and material, respectively and tangentially connected with the spiral flow chamber 11.

FIGS. 7, 9 and 11 are schematic side views showing details of the material outlet end of a reaction chamber 2. FIGS. 8, 10 and 12 are schematic sections taken along the lines 8—8, 10—10 and 12—12, respectively in FIGS. 7, 9 and 11.

FIGS. 7–12 show the lower part of the reaction chamber 2 provided with an inner lining 17 and a flange 18 sealed with a seal ring 19 to a stationary end wall 20 which is mounted to an air outlet 21 of a cooler 22. The lower part of the end wall 20 is provided with an opening 23 defining the material outlet of the reaction chamber 2 and the material inlet of the cooler 22.

In FIGS. 7, 8, 11 and 12 the upper part of the end wall 20 is provided with a secondd opening 24 defining an exhaust gas exit communicating with a gas outlet duct 7 situated at the lower end of the reaction chamber 2.

In FIGS. 7 and 8 the cooler 22 is a grate cooler with a double air outlet 21, the first for removing excess hot exit air from the cooler, situated at the of of the cooler, and the second being box shaped with sidewalls 124 one of which is provided with an opening 25 communicating with the gas inlet end of the suspension inlet duct 1.

In FIGS. 9–12 the cooler 22 is a rotary drum cooler comprising a drum with an end flange 26 which by a seal ring 27 is sealed to a flange 28 on an exit air hood defining the cooler air outlet 21. The exit air hood is provided with an inclined bottom plate 29 leading the material from the material outlet opening 23 to the cooler drum and with sidewalls 124 one of which is provided with an opening 25 communicating with the gas inlet end of the suspension inlet duct 1.

In FIGS. 9 and 10 the top of the exit air hood is provided with a duct 30 for removing excess hot exit air from the cooler 22.

In FIGS. 11 and 12 the area of the material outlet opening 23 is greater than in FIGS. 9 and 10 permitting a part of the exit air from the cooler 22 to pass through the opening 23, quenching the gas at the lower end of the reaction chamber 2 and providing a precooling of the product before it is discharged to the cooler 22.

In the operation of the apparatus illustrated in FIGS. 1–12, the material to be thermally treated is suspended in hot exit air from the cooler 22 in the suspension inlet duct 1. The material to be treated is advantageously preheated, e.g., in suspension by exit gas from the reaction chamber. Fuel is introduced in the suspension inlet duct above, below or at the same height as the material, in the latter case a spouted bed may be built into the duct providing a particularly efficient heat transfer.

The gas velocity in the suspension inlet duct 1 is kept at a level so high that the suspended particles and the gas have almost the same velocity. In order to minimize the risk of formation of cakings it may be desirable that the gas is not subjected to violent changes of direction so that the number of collisions between particles and the wall is kept to a minimum. The risk of cakings may be further reduced in a known manner by drawing in a gas along the walls of the suspension inlet duct.

The suspended material is heated to the treating temperature in few seconds. Then it is introduced into the upper part of the reaction chamber 2 with a tangential velocity component. Due to this velocity component the suspension will perform a rapid helical movement in the upper part of the reaction chamber 2, and the material will be precipitated from the suspension as in an ordinary horizontal cyclone.

In the upper part of the reaction chamber 2 the precipitated material will rotate along the inner surface in an annular material layer, but due to friction the speed of rotation will decrease as the material moves further into the reaction chamber 2 and finally the precipitated material will settle on the bottom of the reaction chamber 2 and form a material layer which will be carried through and subjected to thermal treatment in the reaction chamber with a retention time being determined by the rotational speed of the reaction chamber.

At the lower end of the reaction chamber 2 the material is discharged through the material outlet opening 23 and is introduced into the air cooler 22 where it is cooled countercurrently to cooling air. The hot exit air from the cooler 22 or a part thereof is introduced into the suspension inlet duct 1, the air flow being provided by means of a fan (not shown) and, if desired, being controlled by means of a valve (not shown) in the air inlet end of the suspension inlet duct 1.

A certain amount of (false) air may bypass the suspension inlet duct 1 and pass directly from the cooler 22 to the lower end of the reaction chamber 2 via the material outlet opening 23. However, if desired, the amount of false air can be kept very low by minimizing the area of the material outlet opening 23. As mentioned above, a certain amount of false air may be desirable, especially when the gas outlet is arranged at the lower end of the reaction chamber 2, because it provides a quenching of the exit gas from the reaction chamber 2 and a precooling of the thermally treated material.

The plant shown in FIGS. 13–14 comprises a suspension preheater comprising cyclones 31, 32 and 33, an inlet 34 and an outlet 35 for heating gas, and an inlet 36 and an outlet 37 for pulverous cement raw material; a suspension calciner with a calacination chamber 38 provided with a separating cyclone 39, an inlet 40 for fuel, and an inlet 41 for combustion air and preheated raw material, and an outlet 42 for calcined material from the separating cyclone 39; and a sintering apparatus 43 comprising a reaction chamber 2 rotatable around an axis slightly inclined to the horizontal, a suspension inlet duct 1 provided with inlets 9 and 10 for fuel and material, respectively, the inlet duct 1 having a first end connected to an air cooler 22 and a second end connected to the upper end of the reaction chamber 2, the reaction chamber 2 being provided with a gas outlet duct 7 connected to the lower or upper end of the reaction chamber 2 in FIGS. 13, 14 respectively.

The arrangement at the upper end of the reaction chamber 2 in FIG. 13 may be as shown in FIGS. 1, 2, or FIGS. 5, 6 and at the lower end as shown in FIGS. 7, 8 or 11, 12. As mentioned with reference to FIGS. 9 to 12, the rotary drum cooler 22 may be replaced by a grate cooler. The arrangement at the upper end of the reaction chamber 2 in FIG. 14 may be as shown in FIGS. 3, 4, or FIGS. 5, 6 and at the lower end as shown in FIG. 14 or as shown in FIGS. 9, 10. The gas outlet duct 7 may be axially connected to the reaction chamber 2.

An air cooler 22 for the cooling of the sintered material has an air outlet 21 connected to both the inlet duct 1 of the sintering apparatus 43 and the air inlet 41 of the calciner.

The inlet duct 1 is arranged to introduce material with a tangential component into the reaction chamber 2 as shown in more detail in FIGS. 1–4.

FIGS. 13 and 14 show a grate cooler as cooler 22 which may be provided with a duct (not shown) for excess hot cooling air. Of course the grate cooler can be replaced by a rotary drum cooler.

The method of thermally treating pulverulent material is well suited for sintering material comprising oxides of calcium, silicon, aluminum, and iron, such as calcined cement raw meal to cement clinker. The method can also advantageously be used when extracting alumina from low grade alumina bearing ores, e.g., by the so-called lime and lime/soda processes where a fine ground mixture of alumina bearing ore and limestone/limestone and alkali metal carbonate, respectively, are calcined and sintered to clinker containing the alumina component in soluble form as calcium aluminate and alkali metal aluminate, respectively, and the inpurities in insoluble form, e.g., the $SiO_2$ component as insoluble dicalcium-silicate.

When using the apparatus shown in FIGS. 13 or 14 for manufacturing cement clinker, the procedure will normally be to introduce and preheat the cold cement raw meal in the suspension preheater, suspending the preheated raw meal in an oxygen containing gas in the calcination chamber 38 with simultaneous addition of fuel. The calcined material is then separated from the gas in the separating cyclone 39 and suspended in hot oxygen containing gas, i.e., hot exit air from the clinker cooler 22, in the suspension inlet duct 1.

The hot calcined material coming from the calciner will have an oxide composition typically within the range CaO: 62–66% $Al_2O_3$: 6–10% $SiO_2$: 17–24% and $Fe_2O_3$: 1–6% and a temperature of 800°–850° C. Fuel such as oil, gas or coal dust is introduced in the hot air flow in the suspension inlet duct 1 before, after, simultaneously with, or together with the hot precalcined cement raw meal.

In a few seconds, the material temperature will be raised to 1350°–1450° C., being the sintering temperature of the materials involved.

The suspended material is then introduced into the reaction chamber 2 as previously described.

In the upper part of the reaction chamber 2 the material is separated from the suspension and the separated agglomerating material is then sintered on its way down towards the material outlet. The retention time is controllable by setting the rotational speed of the reacation chamber 2, and will normally be 7–12 minutes.

The temperature of the discharged cement clinker is typically approximately 1400° C. The discharged clinker is then air cooled in the clinker cooler 22.

Part of the hot cooling air, typically having a temperature of 750°–900° C., is used as the above-mentioned hot air in which the calcined raw meal is suspended in the suspension inlet duct 1. The remaining part is passed to the calciner in which it is used as combustion air for the raw meal calcining.

The hot gas discharged from the reaction chamber 2 typically has a temperature of 1400°–1500° C. and is introduced through the duct 7 to the bottom of the calcination chamber 38 and is used as a supplementary heat source for calcining the material. The exit gas from the calciner is used in known manner for preheating the raw meal to be calcined.

To avoid problems of clogging in the exit for the reaction chamber exit gas, it is advantageous to introduce uncalcined or calcined raw meal into the hot gas flow at a position close to the reaction chamber 2. The raw meal is at once suspended in the gas reducing the gas temperature to approximately 850°/1050° C. when uncalcined/calcined material is introduced. At these temperatures the risk of cakings is completely eliminated. Then the gas flow may be introduced into a separator, e.g., a cyclone separator for separating solid material which is passed to the calciner or to the suspension inlet duct when calcined material is introduced.

Typical reaction chamber 2 dimensions include a diameter of 4 m (meters) and a length, of 12-20 m (meters). The rotational speed of the reaction chamber 2 is typically 1-4 r.p.m (revolutions per minute). A typical inclination of the reaction chamber will be 3° and the degree of filling in the reaction chamber is typically 15-20 percent. The production capacity of such a plant is 2000 tons/24 hrs.

I claim:

1. Method of thermally treating pulverulent material in a reaction chamber having its axis slightly inclined to the horizontal, the reaction chamber having an upper end and a lower end, an upper portion and a lower portion, comprising thermally treating the material in suspension in a gas to a predetermined treating temperature outside the reaction chamber, introducing the material in suspension with a tangential velocity component in the upper portion of the reaction chamber adjacent its upper end such that the material heated to the predetermined treating temperature is separated from the suspension in said upper portion of the reaction chamber, as a result of said introducing the material in suspension with a tangential velocity component, rotating the reaction chamber, further thermally treating the separated material during its passage through the reaction chamber, discharging the thermally treated separated material from a lower end portion of the reaction chamber, and withdrawing the gas from the reaction chamber through at least one of its ends.

2. Method of thermally treating, such as sintering, pulverulent material in a generally cylindircal reaction chamber having an upper end and a lower end, an upper portion and a lower portion, the reaction chamber having an axis slightly inclined relative to the horizontal, comprising thermally treating the material in suspension in a gas to a predetermined temperature outside the reaction chamber, introducing the material in suspension heated to the predetermined treating temperature with a tangential velocity component in the upper portion of the reaction chamber adjacent its upper end such that the material is separated from the suspension in said upper portion of the reaction chamber as a result of said introducing the material in suspension with a tangential velocity component, slowly rotating the reaction chamber, further thermally treating, such as by agglomerating and sintering, the separated material during its passage through the reaction chamber, discharging the thermally treated separated material from the lower portion of the reaction chamber adjacent its lower end, and withdrawing the gas from the reaction chamber through at least one of its ends.

3. The method according to claim 2 comprising providing the tangential velocity component of the suspension by introducing the suspension adjacent to a portion of the cylindrical wall of the reaction chamber in a direction sustantially parallel to a tangent to the closest part of said portion of the cylindrical wall and generally or almost perpendicular to the axis of the reaction chamber.

4. The method according to claim 2 comprising providing the tangential velocity component of the suspension by rotating the suspension before it is introduced axially into the reaction chamber.

5. The method according to any of claims 2, 3 or 4 comprising withdrawing the gas from the reaction chamber through the upper end.

6. The method according to any of claims 2, 3 or 4 comprising withdrawing the gas from the reaction chamber through the lower end.

7. Method of thermally treating, in particular sintering, pulverulent material in a cylindrical reaction chamber having an upper end and a lower end, an upper portion and a lower portion, the reaction chamber having an axis slightly inclined to the horizontal, comprising thermally treating the material to a predetermined treating temperature outside the reaction chamber while the material is suspended in a gas, introducing the material heated to the predetermined treating temperature in suspension into the upper portion of the reaction chamber adjacent its upper end, separating the material from the suspension in the upper portion of the reaction chamber by said introducing the material in suspension with a tangential velocity component, keeping the reaction chamber in a slowly rotating movement and further thermally treating, in particular agglomerating and sintering, the separated material during its passage through the reaction chamber, discharging the thermally treated material from the lower end of the reaction chamber, and withdrawing the gas from the reaction chamber through one of its ends.

8. The method according to claim 7 wherein the suspended preheated material is separated from the suspension substantially in the upper portion of the reaction chamber and the material is introduced into the reaction chamber with such a tangential velocity component so as to cause a rapid helical or spiral movement of the material as it is introduced into the reaction chamber thereby to act substantially as a horizontal cyclone.

9. The method according to claim 7 wherein the pulverulent material is pulverous cement raw meal.

10. Apparatus for thermally treating pulverulent material comprising a reaction chamber having an upper end and a lower end, an upper portion and a lower portion, the reaction chamber having its axis slightly inclined to the horizontal, means for thermally treating the material in suspension in a gas to a predetermined treating temperature outside the reaction chamber, means for introducing the material in suspension with a tangential velocity component in the upper portion of the reaction chamber adjacent its upper end such that the material heated to the predetermined treating temperature is separated from the suspension in said upper portion of the reaction chamber as a result of said introducing the material in suspension with a tangential velocity component, means for rotating the reaction chamber, means for further thermally treating the separated material during its passage through the reaction chamber, means for discharging the thermally treated separated material from a lower portion of the reaction chamber adjacent its lower end, and means for withdrawing the gas from the reaction chamber through at least one of its ends.

11. Apparatus for thermally testing, such as by sintering, pulverulent material comprising a generally cylindrical reaction chamber having an upper end and a lower end, an upper portion and a lower portion, the reaction chamber having an axis slightly inclined relative to the horizontal, the reaction chamber being rotatable around said axis and having stationary end walls, means for thermally treating the material in suspension in a gas to a predetermined treating temperature outside the reaction chamber, means for introducing the material in suspension heated to the predetermined treating temperature with a tangential velocity component in the upper portion of the reaction chamber adjacent its upper end such that the material is separated from the suspension in said upper portion of the reaction chamber as a result of said introducing the material in suspension with a tangential velocity component, means for slowly rotating the reaction chamber, means for further thermally treating, such as by agglomerating and sintering, the separated material during its passage through the reaction chamber, means for discharging the thermally treated separated material from the lower portion of the reaction chamber adjacent its lower end, and means for withdrawing the gas from the reaction chamber through at least one of its end.

12. The apparatus according to claim 11 wherein the separating means includes a suspension inlet duct connected to the upper end of the reaction chamber substantially tangentially to the inner circumferential surface of the reaction chamber.

13. The apparatus according to claim 12 wherein the gas withdrawing means includes a gas outlet duct connected to at least one end of the reaction chamber.

14. The apparatus according to claim 13 wherein the discharging means includes an outlet for the thermally treated material at the lower end of the reaction chamber.

15. The apparatus according to claim 11 wherein the reaction chamber is provided with a constriction member positioned at a distance from the suspension inlet duct constituting approximately one third of the total length of the reaction chamber.

16. The apparatus according to any one of claims 12, 13, 14 or 15 wherein the tangential connection between the suspension inlet duct and the upper end of the reaction chamber is provided by mounting the suspension inlet duct at an inlet opening in the upper end wall adjacent to a portion of the cylindrical wall of the reaction chamber in a direction substantially parallel to a tangent in the closest part of said portion of the cylindrical wall and generally perpendicular to the axis of the reaction chamber.

17. The apparatus according to any of claims 12, 13, 14 or 15 wherein the tangential connection between the suspension inlet duct and the upper end of the reaction chamber is provided via a stationary cylindrical member being coaxial with and smaller in diameter than the reaction chamber defining a spiral flow chamber with a tangential suspension inlet and an axial suspension outlet communicating with the reaction chamber.

18. The apparatus according to claim 10 wherein said means for admitting the material with a tangential velocity component in the upper end portion of the reaction chamber is such as to admit the material into the reaction chamber with a tangential velocity component so as to act substantially as a horizontal cyclone with a rapid helical or spiral movement of the material in the reaction chamber.

19. The apparatus according to claim 18 wherein the pulverulent material is in the form of pulverous raw meal.

* * * * *

UNITED STATES PATENT AND TRADEMARK OFFICE
CERTIFICATE OF CORRECTION

PATENT NO. : 4,420,303                       (Page 1 of 2)

DATED : December 13, 1983

INVENTOR(S) : Hans Brun Knudsen

It is certified that error appears in the above-identified patent and that said Letters Patent is hereby corrected as shown below:

In Column 3, line 57, "downwardly" should read --downwards--.

In Column 5, line 29, "durm" should read --drum--.

In Column 5, line 32, "trangential" should read --tangential--.

In Column 5, line 54, "is" should read --its--.

In Column 6, line 22, "sustantially" should read --substantially--.

In Column 7, line 18, "tnagential" should read --tangential--.

In Column 8, line 29, "secondd" should read --second--.

In Column 8, line 34, "of of" should read --top of--.

UNITED STATES PATENT AND TRADEMARK OFFICE
CERTIFICATE OF CORRECTION

PATENT NO. : 4,420,303
DATED : December 13, 1983
INVENTOR(S) : Hans Brun Knudsen It is certified that error appears in the above-identified patent and that said Letters Patent is hereby corrected as shown below:

In Column 9, line 48, "calacination" should read --calcination--.

In Column 10, line 56, "reacation" should read --reaction--.

In Column 11, line 47, "as sintering" should read --as by sintering--.

In Column 11, line 53, "predetermined temperature" should read --predetermined treating temperature--.

Signed and Sealed this

Eighth Day of May 1984

[SEAL]

Attest:

GERALD J. MOSSINGHOFF

Attesting Officer

Commissioner of Patents and Trademarks